Patented June 14, 1927.

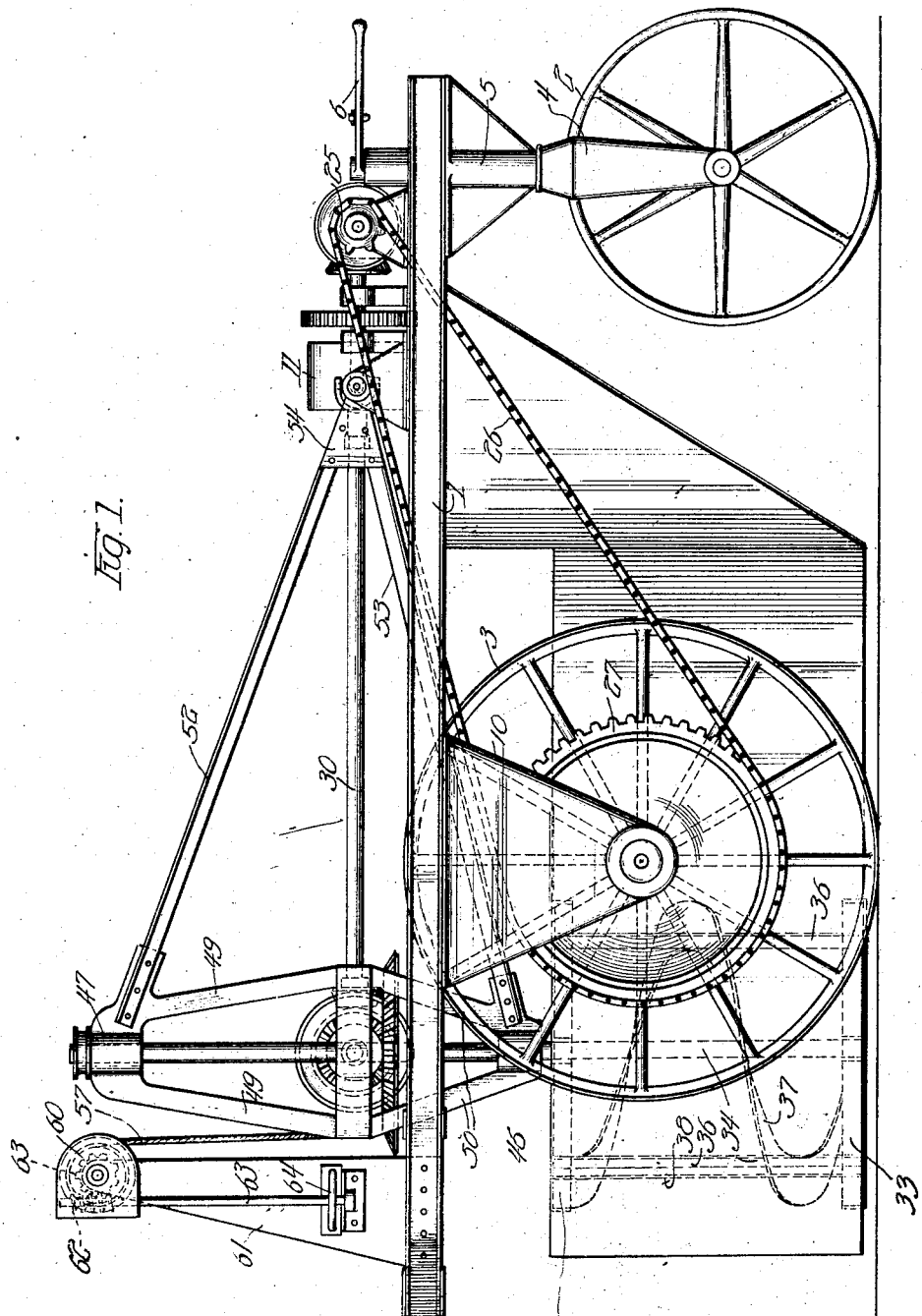

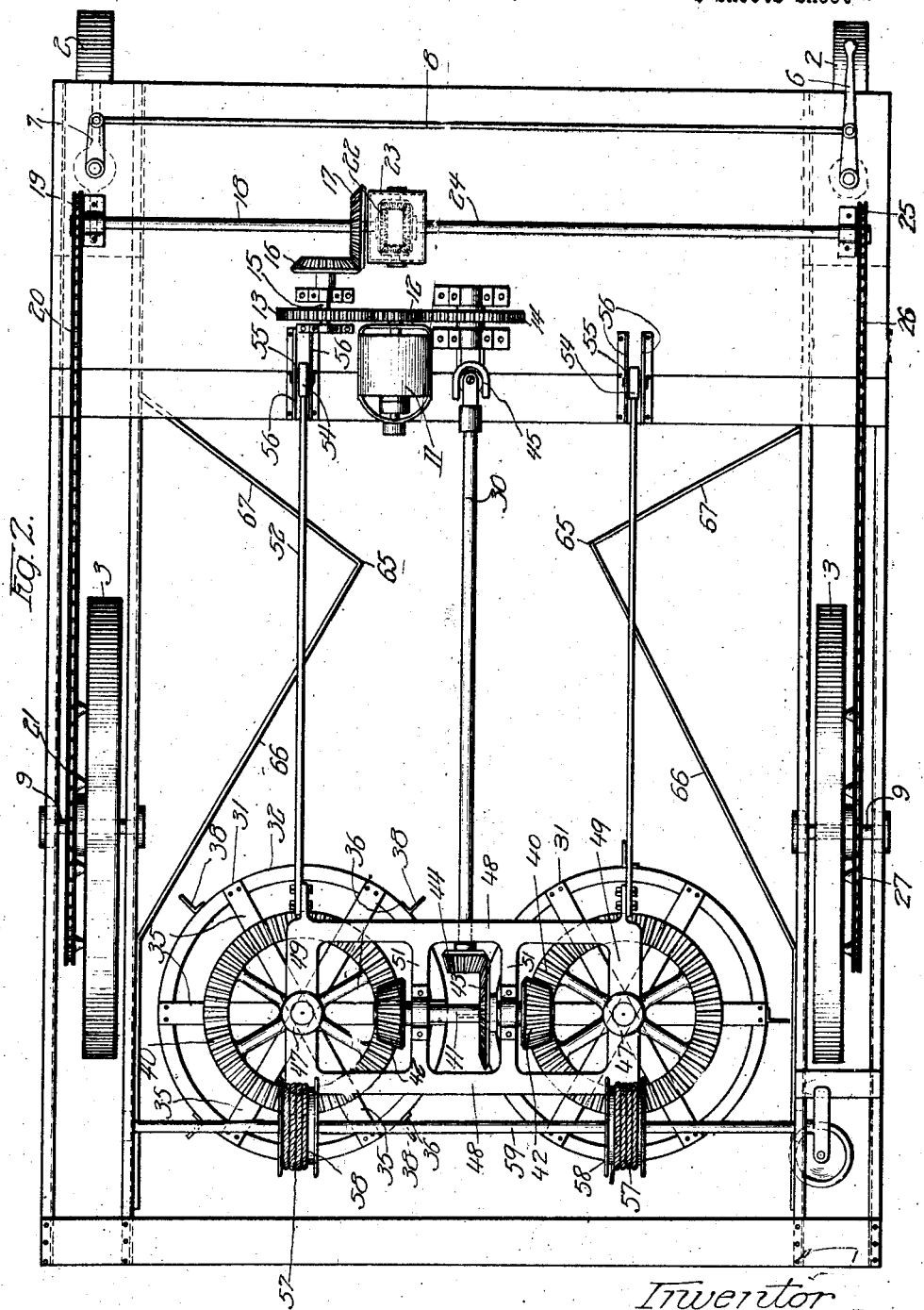

1,632,746

UNITED STATES PATENT OFFICE.

VERNE E. MINICH, OF NEW YORK, N. Y., ASSIGNOR TO THE AMERICAN FOUNDRY EQUIPMENT COMPANY, OF NEW YORK, N. Y., A CORPORATION OF OHIO.

APPARATUS FOR CUTTING AND MIXING SAND.

Application filed February 4, 1920. Serial No. 356,307.

My invention relates to apparatus for cutting and mixing sand, and especially to apparatus for mixing the sand used in foundries to make molds in which metal is cast.

The invention relates more particularly to that type of sand cutters or mixers which travel along the floor, cutting and mixing the sand of a heap and leaving it in condition ready for use by the molders, in which type of apparatus it is customary to have the cutting and mixing devices mounted on wheels for convenient movement.

One object of the present invention is to provide a simple, practical and efficient apparatus of the class specified.

Another object of the invention is to secure effectiveness of operation and also to secure ready handling and adjustment of the apparatus as required by different circumstances.

Other objects of the invention are to provide simple and advantageous devices for cutting and mixing the sand; to arrange for the quick and ready control of the apparatus and its various parts, and also for the easy control of the movements of the entire machine of the device; and to secure the foregoing and other desirable results in a simple and advantageous manner.

In the accompanying drawings Fig. 1 is a side elevation of a sand cutting and mixing machine embodying my present invention; and Fig. 2 is a plan view of the same.

Referring to the drawings I show a machine having a body frame 1 mounted on back wheels 2—2 and front wheels 3—3. The back wheels 2—2 are mounted in forks 4 supported by posts 5, at the upper end of one of which is a steering handle 6. At the upper end of the other end of the post is a small cross arm 7 and a rod 8 is preferably extended between the cross arm 7 and the handle 6 so that said rear wheels 2—2 may be operated in unison.

The front wheels 3—3 are mounted on axles 9—9 which are supported in bearings at the lower end of side members 10 secured to and extending downwardly from the lower surface of the side members of the frame 1. These front wheels 3—3 are the drive wheels of the machine and are driven by suitable power connection as will be explained hereinafter.

For the purposes of supplying power to drive the machine and also to drive the sand cutting and mixing devices thereof, a motor 11 is shown mounted on the frame of the machine near the rear end of the same. This is preferably an electric motor of any desired type or form, and is understood to be suitably connected with a source of electrical power or energy so that it may be readily driven. This motor 11 is shown provided with a gear drive wheel 12 and this wheel 12 is shown in contact with and arranged to drive two other gear wheels 13 and 14, one on each side of said wheel 12. The wheel 13 is mounted on a shaft 15 carrying a mitre wheel 16 which meshes with another mitre wheel 17 on a rotary drive shaft 18. This drive shaft 18 is extended to one side of the machine and its outer end provided with a sprocket wheel 19 carrying a sprocket chain 20 which is extended around a sprocket wheel 21 on one of the front wheels 3 (Fig. 2). The other end of the shaft 18 is provided with a mitre wheel 22 forming part of a gear changing device 23, from which latter there is extended another drive shaft 24 which extends to the other side of the machine and carries a sprocket 25 carrying a chain 26 which runs over a gear 27 carried by the other front driving wheel 3. By means of the gear changing device 23 the shafts 18 and 24 may be so connected as to run either in the same or in opposite directions. Thus by means of the motor 11 the drive wheels 3—3 may be driven so as to advance or move the whole machine over the floor or surface on which it may be placed, and by means of the gear changing device 23 the shafts 18 and 24 by being propelled in the same direction will cause the machine to travel in a straight line either front or back, but by being propelled in opposite directions will cause the machine to turn to one side or the other.

The motor 11 by means of the other gear drive wheel 14 propels a rotary shaft 30 by means of which the sand mixing and cutting devices are actuated.

These sand mixing and cutting devices comprise two rotary members 31—31 located near the front of the machine and mounted for vertical rotation. Each rotary member preferably consists of an upper frame 32 and a lower frame 33, each mounted on a vertical shaft 34, said frames 32 and 33 being conveniently held in proper position by radial members 35 and vertically arranged members 36. Each rotary member 31 is provided with a helically arranged sand cutting device 37, the lower end of which is attached to the lower frame 33 and the upper end of which is attached to the upper frame 32. Each helical cutting device 37 is adapted to cut and mix the sand when the rotary member carrying it is rotated. Each rotary member is also preferably provided with radially projecting blades 38—38 secured to the upper and lower frames 32 and 33 and preferably formed integral with and extending outwardly from the vertical members 36. These blades 38 also cut and mix the sand when the rotary members carrying them are rotated. Preferably the blades on one rotary member are slightly out of register with the blades on the other rotary member, and are of greater width than half the distance between said rotary members, whereby said blades will slightly overlap as the rotary members are rotated and will thus prevent passage of sand between said rotary members.

As an arrangement for driving said rotary members 31—31 I show toothed wheels or gears 40 on the top of each member and a cross shaft 41 provided with pinions 42—42 adapted to mesh with said gears 40. The shaft 41 is also provided with a beveled gear 43 meshing with a pinion 44 on the driving shaft 30 which has been previously referred to as being driven by the motor 11 through the drive wheel 14, there preferably being a universal joint or clutch 45 at the end of the shaft 30 between the same and the shaft carrying the drive wheel 14. Thus the rotation of the motor 11 will cause the rotation of the rotary members 31—31 and the rotation of these latter will cause the cutting and mixing devices thereon to cut and mix the sand.

The rotary shafts 34 on which the mixing cylinders 31 are mounted are preferably of substantially greater length than the length of the mixing cylinders 31 and extend upwardly above the upper ends of said cylinders or members 31. This permits said shafts 31 to be mounted in bearings 46 and 47 both above the members 31, the bearing 47 being substantially elevated above the bearing 46. Both of said bearings 46 and 47 are preferably carried by a frame having cross members 48—48 and end members 49—49 which extend upwardly and provide the elevated bearings 47, and downwardly extending members 50—50 which provide the lower bearings 46. This frame also has intermediate transversely extending members 51—51 which provide bearings for the cross shaft 41. This entire frame with its members 48, 49 and associated parts, is vertically adjustable and the gearing and driving mechanism which it carries, as well as the mixing members or cylinders 31, are bodily adjustable with said frame, whereby there is permitted a certain amount of vertical adjustment on the part of the mixing and cutting members 31 so as to allow their adjustment as desired. This adjustable frame is secured by elevated braces or supporting members 52 and lower braces or supporting members 53, and these latter converge and meet and are secured together at their forward ends by angle pieces 54. These angle pieces 54 are pivotally connected with the frame of the machine by means of pivots 55 supported in brackets 56—56 on the body frame of the machine. By this mounting for the adjustable cutting and mixing mechanism carrying frame, taken in connection with the flexible or universal joint for the shaft 30, the entire mixing and cutting mechanism may be bodily raised or lowered as desired.

Any suitable means may be provided for disconnecting the cutters from the motor, when it is desired to move the machine under its own power from place to place.

As one means for effecting this vertical adjustment, I show flexible connectors 57 mounted on reels or drums 58, which latter are carried by a rotatable shaft 59 extended crosswise of the frame of the machine and supported in elevated bearings 60 mounted on standards 61 at the opposite sides of the machine. The flexible connectors 57 are connected with the rear frame pieces 48 and a worm and wheel drive 62—63 is provided controlled by a shaft 63 having a hand wheel 64 so that by turning the hand wheel 64, a vertical adjustment either up or down may be secured.

The machine is also preferably provided with sand deflecting members 65—65 secured to the sides of the machine frame and having inwardly inclined members 66 extending inwardly at an inclination from the opposite sides of the machine. These inclined members 66 deflect the sand after it has been cut and mixed by the cutting and mixing devices and heat it in position between the sides of the machine. The rear ends 67 of the members 65 extend back to the sides of the machine frame so as to form supports or braces for the members 66.

It will be understood that changes and modifications may be made without departing from the spirit of the invention.

What I claim is:

1. The combination of a vertically adjustable frame provided with two sets of bearings, one bearing in each set being above the other, rotary shafts mounted in said bearings, and rotary members carried by said shafts and located below the lower bearings, said rotary members being provided with sand mixing and cutting devices, said mixing and cutting devices comprising helical cutters and straight cutting blades arranged outside of said helical cutters lengthwise of the axis thereof.

2. The combination of a pair of independently rotatable members, each rotating about an independent vertical axis and each provided with vertical helical cutting blades and other cutting blades arranged side by side close to one another and intermeshing in operation.

3. The combination of a pair of rotary members, each rotating about a vertical axis and each provided with helical cutting devices, said rotary members being arranged side by side close to one another, and also being provided with vertically arranged radial cutting devices located at the periphery of said helical cutters and extending lengthwise of the rotary axes thereof.

4. The combination of a pair of rotary members, each rotating about an independent vertical axis and each provided with helical cutting blades, said rotary members being arranged with their axes parallel, and means for rotating said rotary members in unison, and other cutting blades arranged to intermesh when rotating.

5. The combination with a body frame and sand mixing and cutting devices between the sides thereof, of sand heaping devices comprising members secured to the sides of the machine frame and extending inwardly and rearwardly in the rear of said mixing and cutting devices.

6. In combination, a chassis, a power plant thereon, a vertically adjustable frame at the front of the chassis, said frame carrying rotary sand cutting members having vertical axes of rotation and adapted to act sidewise on a pile of material on the floor or surface on which the machine rests and travels, and said frame being adjustable vertically above said floor so as to permit said cutting devices to act upon the material piled on the floor, means whereby said frame can be adjusted to secure such adjustment of said cutting devices, a driving connection between the power plant and cutting devices adapted to permit the aforesaid adjustment of the latter, and means in the rear of said cutting devices for directing the sand acted on by the cutting devices inwardly toward the center of the machine.

7. In a machine of the class described, a chassis, a motor on said chassis, a vertically adjustable frame on the chassis carrying shafts having rotary sand mixing and cutting members, said frame having vertically alined separated pairs of bearings for each of said shafts, and a gear driving connection from said motor to said shafts between the bearings of each pair.

8. In combination, a chassis mounted on wheels, a prime mover on said chassis, a vertically adjustable frame on said chassis comprising substantially triangular side frames, and a web connecting said frames, vertically alined bearings in said side frames, horizontally alined bearings in said web, vertical and horizontal shafts arranged for rotation in said vertical and horizontal bearings, respectively, gearing interconnecting said shafts, helical cutting devices carried by the vertical shafts, a driving shaft connected to said prime mover, said triangular frames being hinged on said chassis, and a universal joint in said driving shaft.

9. In a machine of the class described in combination, a chassis, driving wheels supporting said chassis at its forward end, a power plant mounted on the rear end of said chassis, a rigid vertically bodily movable frame hinged at the rear end of said chassis and extending toward the forward end thereof, said chassis completely encompassing the frame, a pair of vertical helical cutting devices rotatable in said frame on independent parallel shafts, a counter shaft connecting said parallel shafts above the cutting devices, and a jointed shaft having bearings in said frame and chassis and connected between said power plant and said counter shaft.

In witness whereof I hereunto subscribe my name this 10th day of January, A. D., 1920.

VERNE E. MINICH.